United States Patent
Li et al.

(10) Patent No.: US 10,502,193 B2
(45) Date of Patent: Dec. 10, 2019

(54) REPAIR METHOD FOR A GEARBOX ASSEMBLY OF A WIND TURBINE

(71) Applicant: General Electric Company, Schenectady, NY (US)

(72) Inventors: Rong Li, Shanghai (CN); Jonathan Paul Signore, Latham, NY (US); Tingyu Zhang, Shanghai (CN); Wei Zheng, Shanghai (CN); Souvik Porel, Bangalore (IN); Priyangu C. Patel, Simpsonville, SC (US); James Edward Cencula, Greer, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/967,651

(22) Filed: May 1, 2018

(65) Prior Publication Data

US 2018/0283360 A1    Oct. 4, 2018

(30) Foreign Application Priority Data

Mar. 29, 2017    (CN) .......................... 2017 1 0196840

(51) Int. Cl.
| | |
|---|---|
| *F03D 80/50* | (2016.01) |
| *F03D 15/00* | (2016.01) |
| *F16H 57/02* | (2012.01) |
| *F16H 57/021* | (2012.01) |
| *F16H 57/023* | (2012.01) |

(52) U.S. Cl.
CPC ............ *F03D 80/50* (2016.05); *F03D 15/00* (2016.05); *F05B 2230/80* (2013.01); *F05B 2260/4031* (2013.01); *F16H 57/021* (2013.01); *F16H 2057/0235* (2013.01); *F16H 2057/02078* (2013.01); *Y02E 10/722* (2013.01)

(58) Field of Classification Search
CPC ................ F03D 80/50; F05B 2230/80; F16H 2057/02078; Y02E 10/72; Y02E 10/722
See application file for complete search history.

(56) References Cited

U.S. PATENT DOCUMENTS

| | | | | |
|---|---|---|---|---|
| 4,527,072 A | * | 7/1985 | van Degeer | .......... F03D 7/0224 |
| | | | | 290/55 |
| 7,944,079 B1 | * | 5/2011 | Signore | ................... F03D 15/00 |
| | | | | 290/55 |

(Continued)

FOREIGN PATENT DOCUMENTS

| | | | | |
|---|---|---|---|---|
| DE | 102011006665 A1 | * | 10/2012 | ............. F03D 80/80 |
| DE | 102014204479 A1 | * | 9/2015 | ............... H02K 1/30 |

(Continued)

*Primary Examiner* — Jacob J Cigna
(74) *Attorney, Agent, or Firm* — Dority & Manning, P.A.

(57) ABSTRACT

A repair method for a gearbox assembly for a wind turbine is disclosed. The gearbox includes a gearbox housing having an upwind end and a downwind end, a gear assembly configured within the gearbox housing, at least one shaft configured with the gear assembly and extending from the gearbox housing to a generator of the wind turbine, and a sleeve assembly configured with the gearbox housing. Further, the sleeve assembly is removable so as to provide additional space in the gearbox housing during at least one of disassembly or assembly of the gearbox assembly such that the various components can be easily repaired and/or replaced.

13 Claims, 10 Drawing Sheets

(56) References Cited

U.S. PATENT DOCUMENTS

| | | | |
|---|---|---|---|
| 8,591,371 B2 | 11/2013 | Dinter et al. | |
| 2003/0102677 A1* | 6/2003 | Becker | F03D 15/10 290/55 |
| 2005/0042101 A1* | 2/2005 | Hur | F03D 15/10 416/132 B |
| 2007/0025840 A1* | 2/2007 | Weaver | F03D 13/10 415/122.1 |
| 2010/0021278 A1* | 1/2010 | Stegemann | B66C 23/06 414/629 |
| 2010/0133854 A1* | 6/2010 | Jansen | F16H 1/28 290/1 C |
| 2010/0275442 A1* | 11/2010 | Ohl, Jr. | B23P 11/00 29/889.1 |
| 2011/0101699 A1* | 5/2011 | Segovia | F03D 15/10 290/55 |
| 2011/0140448 A1 | 6/2011 | Takeuchi et al. | |
| 2011/0150383 A1* | 6/2011 | Yoshida | F16C 23/08 384/590 |
| 2011/0162194 A1* | 7/2011 | Sugimoto | B66C 9/02 29/592.1 |
| 2011/0243754 A1 | 10/2011 | Luneau et al. | |
| 2012/0114488 A1 | 5/2012 | Giger | |
| 2012/0131786 A1* | 5/2012 | Neumann | F03D 15/00 29/464 |
| 2012/0141292 A1* | 6/2012 | Signore | B66C 1/108 416/244 R |
| 2012/0177311 A1* | 7/2012 | Isayama | F16H 57/082 384/416 |
| 2013/0157802 A1* | 6/2013 | Ordonez Vicente | F16H 57/082 475/348 |
| 2013/0187390 A1* | 7/2013 | Smook | F03D 7/0248 290/55 |
| 2014/0259590 A1* | 9/2014 | Eddy | B66C 23/166 29/402.03 |
| 2015/0096174 A1* | 4/2015 | Lohan | F16C 33/60 29/889.1 |
| 2015/0285215 A1* | 10/2015 | Bennett | B66C 23/207 414/800 |
| 2016/0131105 A1* | 5/2016 | Westergaard | F03D 15/00 29/468 |
| 2017/0211547 A1* | 7/2017 | Thomas | F03D 13/10 |
| 2018/0238308 A1* | 8/2018 | Signore | F03D 80/50 |
| 2018/0313329 A1* | 11/2018 | Vanderwalker | F03D 80/70 |
| 2018/0313330 A1* | 11/2018 | Vanderwalker | F03D 80/50 |

FOREIGN PATENT DOCUMENTS

| | | |
|---|---|---|
| WO | 2012/029121 A1 | 3/2012 |
| WO | 2015/022309 A1 | 2/2015 |

* cited by examiner

REPAIR METHOD FOR A GEARBOX ASSEMBLY OF A WIND TURBINE

FIELD OF THE INVENTION

The present disclosure relates generally to wind turbines, and more particularly to a gearbox assembly for a wind turbine that can be easily repaired and/or replaced uptower.

BACKGROUND OF THE INVENTION

Wind power is considered one of the cleanest, most environmentally friendly energy sources presently available, and wind turbines have gained increased attention in this regard. A modern wind turbine typically includes a nacelle, a tower mounted atop the nacelle, a generator, a gearbox, and a rotor assembly having one or more rotor blades. More specifically, for many wind turbines, the rotor assembly is coupled to the generator through the gearbox. Further, the rotor assembly and the gearbox are typically mounted on a bedplate support frame located within the nacelle. For example, in many wind turbines, the gearbox is mounted to the bedplate via one or more torque supports or arms. The one or more rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The majority of commercially available wind turbines utilize multi-stage geared drivetrains to connect the turbine blades to electrical generators. The wind turns the turbine blades, which spin a low speed shaft. The low speed shaft is coupled to an input shaft of a gearbox, which has a higher speed output shaft connected to a generator. More specifically, the gearbox contains a housing that uses gears and/or gear trains to provide speed and torque conversions from the low speed shaft to the high speed shaft of the generator. Thus, the geared drivetrain aims to increase the velocity of the mechanical motion. For example, in some wind turbines, the gearbox increases the rotational speeds from less than about 20 rotations per minute (rpm) to about 1,000-1,800 rpm, which is the rotational speed required by most generators to produce electricity.

Typical wind turbine gearbox structures are compact and the available distance between gearbox components is very limited. Due to the strict constraints of the gearbox components, it is difficult to remove and/or replace various gearbox components while retaining the gearbox in its uptower location in the nacelle.

Thus, a gearbox assembly that addresses the aforementioned issues would be advantageous. More specifically, a gearbox assembly that allowed for easier uptower repair and/or replacement of its various components would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a method for disassembling a gearbox of a wind turbine. The gearbox is operably coupled to a generator via a gearbox shaft and is housed within a nacelle mounted atop a tower of a wind turbine. The method includes removing one or more downwind securement components of a gearbox shaft of the gearbox, removing a downwind gearbox bearing of the gearbox, supporting the gearbox shaft via at least one support component, and removing at least one sleeve assembly that is embedded within the gearbox housing so as to create additional space for repair and/or replacement of one or more gearbox components.

In one embodiment, the step of removing the downwind gearbox bearing of the gearbox may include mounting a tooling device at the downwind end of the gearbox housing of the gearbox and securing the gearbox shaft and the downwind gearbox bearing into the tooling device.

In another embodiment, the downwind securement component(s) of the gearbox shaft of the gearbox may include a cover plate, an oil slinger, an anti-rotation pin, an oil shield ring, a lock nut, or similar. In further embodiments, the support component(s) may include straps, slings, or similar.

In yet another embodiment, the method may further include removing a pressing plate from the upwind gearbox bearing before removing the first sleeve that is embedded within the upwind end of the gearbox housing.

In another embodiment, the method may include moving the gearbox shaft towards the generator. In such embodiments, the inner race of the upwind gearbox bearing may be installed on the gearbox shaft as the shaft is moved, whereas the outer race of the upwind gearbox bearing may remain in place. As such, the method may also include removing the outer race of the upwind gearbox bearing from the gearbox housing after the gearbox shaft is moved. Alternatively, the inner race and the outer race of the upwind gearbox bearing may be installed on the gearbox shaft as the shaft is moved. In still another alternative embodiment, the inner race and the outer race of the upwind gearbox bearing may remain in place as the shaft is moved.

In further embodiments, the method may include moving the gearbox shaft and the inner race of the upwind gearbox bearing away from a gearbox shaft pinion and/or one or more bull gears before moving the gearbox shaft towards the generator.

In additional embodiments, the step of removing at least one sleeve assembly that is configured with the gearbox housing may include removing a first sleeve that is embedded within an upwind end of the gearbox housing. In yet another embodiment, the step of removing at least one sleeve assembly that is configured with the gearbox housing further may include removing at least one additional sleeve that is embedded within the upwind end or the downwind end of the gearbox housing. It should be understood that the method may further include any additional steps and/or features as described herein.

In another aspect, the present disclosure is directed to a method for repairing and/or replacing one or more gearbox components of a wind turbine gearbox uptower. The method includes removing one or more downwind securement components of a gearbox shaft of the gearbox. The method also includes removing a downwind gearbox bearing of the gearbox. Another step includes supporting the gearbox shaft via at least one support component. Further, the method includes removing at least one sleeve assembly that is embedded within at upwind end of the gearbox housing. Moreover, the method includes moving the gearbox shaft towards the generator with the inner race of the upwind gearbox bearing installed thereon and the outer race of the upwind gearbox bearing remaining in place. In addition, the method includes removing the outer race of the upwind gearbox bearing from the gearbox housing. Further, the method includes repairing at least one of the downwind gearbox bearing, the upwind gearbox bearing, or the gearbox shaft.

In yet another aspect, the present disclosure is directed to a gearbox assembly for a wind turbine. The gearbox assembly includes a gearbox housing having an upwind end and a downwind end, a gear assembly housed within the gearbox housing, at least one shaft engaged with the gear assembly and extending from the gearbox housing to a generator of the wind turbine, and a sleeve assembly configured with the gearbox housing and the shaft. Further, the sleeve assembly is removable so as to provide additional space in the gearbox housing during at least one of disassembly or assembly of the gearbox assembly.

In one embodiment, the sleeve assembly is embedded at least partially within the gearbox housing. In another embodiment, the sleeve assembly is located at the upwind end of the gearbox housing. In further embodiments, the gearbox assembly may include at least one additional sleeve assembly mounted at the downwind end of the gearbox housing. More specifically, in certain embodiments, the gearbox assembly may include a plurality of sleeve assemblies mounted at the upwind or downwind ends of the gearbox housing.

In additional embodiments, the sleeve assembly may have a split configuration with a first sleeve and a second sleeve. In such embodiments, the first sleeve and the second sleeve may be arranged in a ring-shape configuration. Thus, one of the sleeves may be removed, while other sleeves can remain in place.

In yet another embodiment, the gearbox assembly may include at least one mounting component configured to secure the sleeve assembly to the gearbox, or more specifically the gearbox housing. For example, in certain embodiments, the mounting component may include a flange, a fastener, an adhesive, or similar.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a gearbox assembly of a wind turbine and method of disassembling and/or assembling same such that various gearbox components can be easily repaired and/or replaced. More specifically, in one embodiment, the gearbox assembly includes a gearbox housing having an upwind end and a downwind end, a gear assembly housed within the gearbox housing, at least one shaft engaged with the gear assembly and extending from the gearbox housing to a generator of the wind turbine, and a sleeve assembly configured with the gearbox housing. Further, the sleeve assembly is removable so as to provide additional space in the gearbox housing during at least one of disassembly or assembly of the gearbox assembly. As such, the gearbox assembly provides improved uptower serviceability as technicians are no longer required to separate the gearbox upper housing and lower housing so as to overcome the overlapping issue between the bull gear and pinion.

Figure 1:
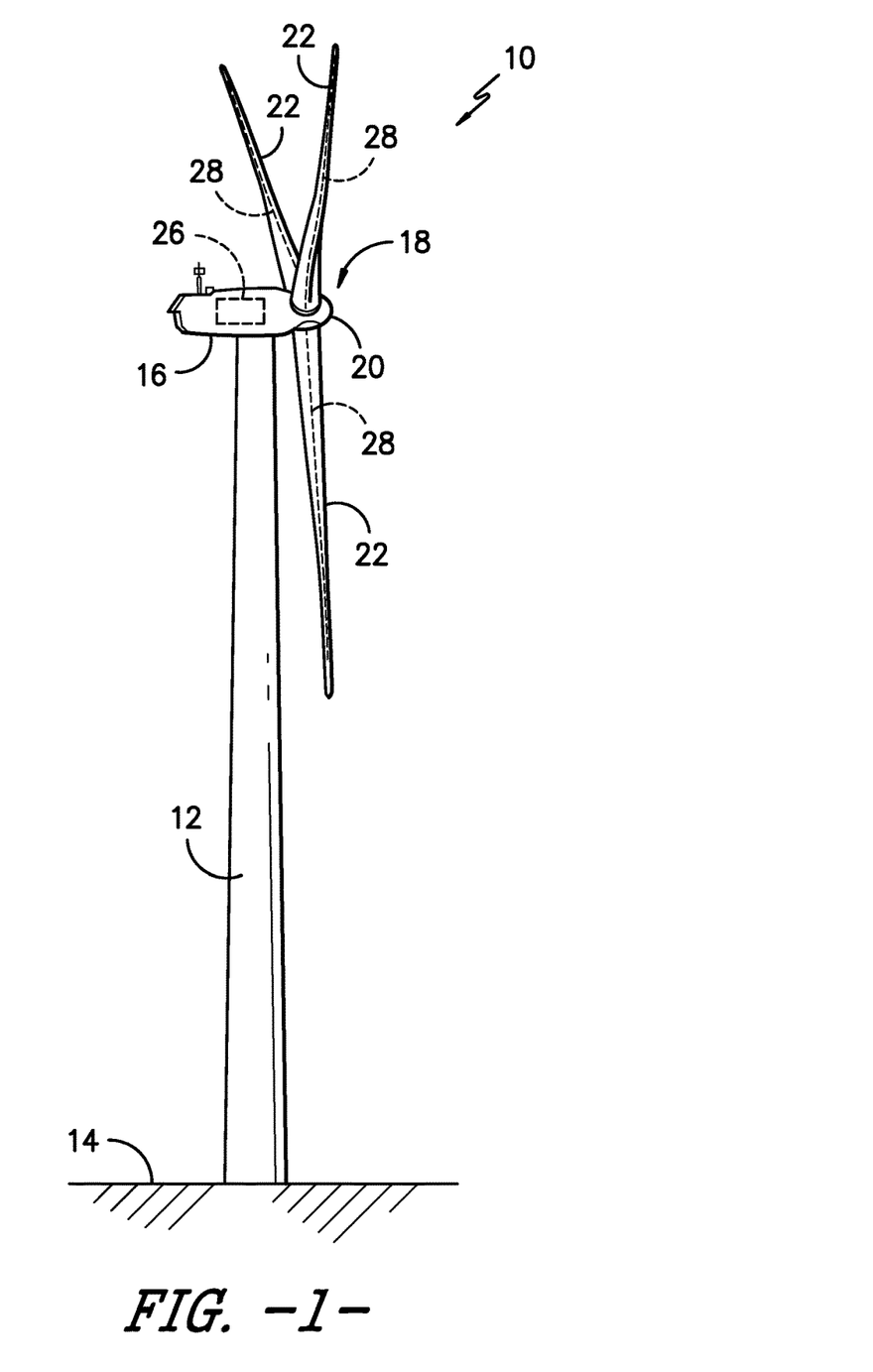
FIG. 1 illustrates a perspective view of one embodiment of a wind turbine according to the present disclosure.

Referring now to the drawings, FIG. 1 illustrates a perspective view of one embodiment of a wind turbine 10 according to the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine 10. Further, the controller 26 may be communicatively coupled to any number of the components of the wind turbine 10 in order to control the components. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals.

Figure 2:
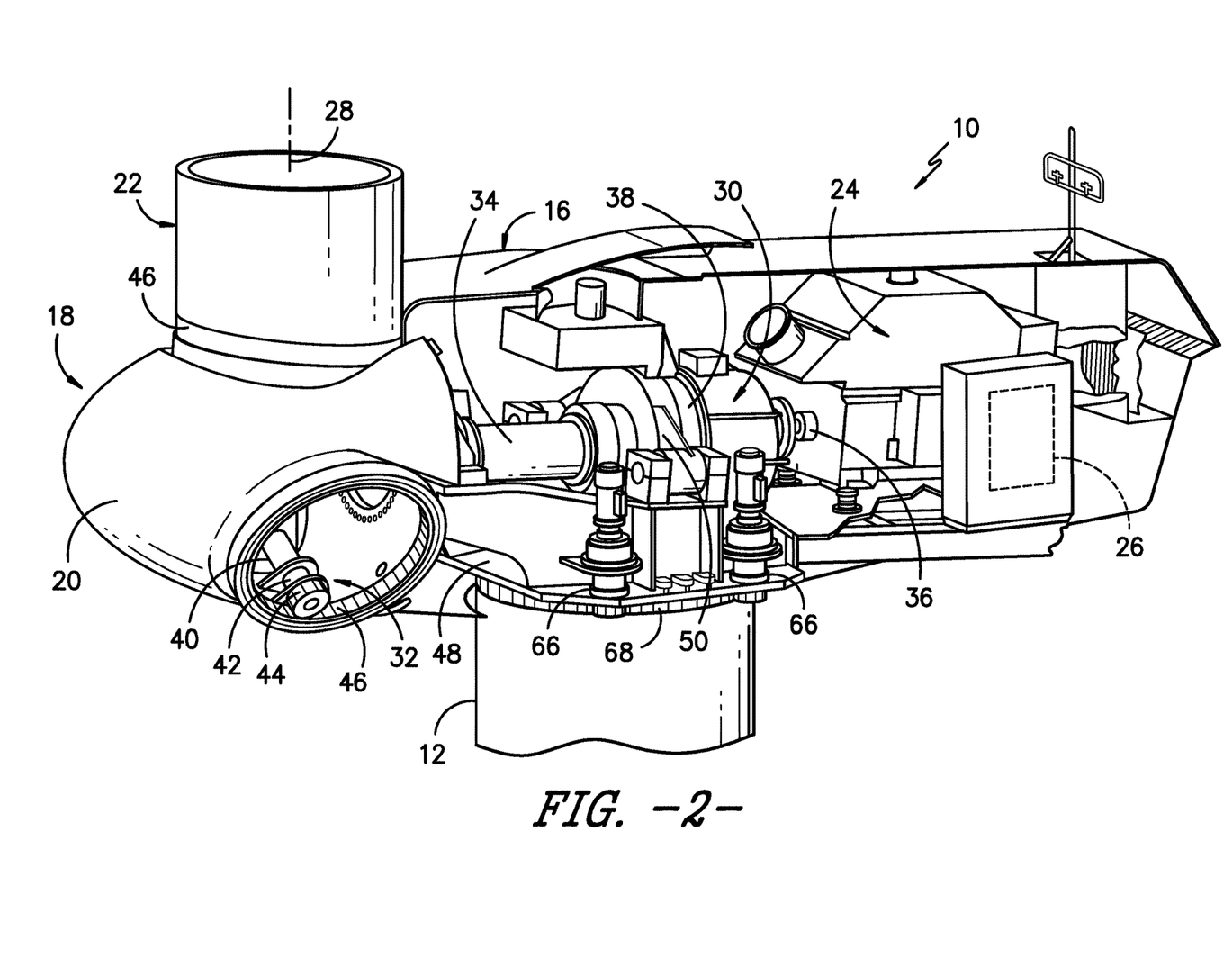
FIG. 2 illustrates a perspective view of a simplified, internal view of one embodiment of a nacelle of a wind turbine according to the present disclosure.

Referring now to FIG. 2, a simplified, internal view of one embodiment of the nacelle 16 of the wind turbine 10 shown in FIG. 1 is illustrated. As shown, the generator 24 may be coupled to the rotor 18 for producing electrical power from the rotational energy generated by the rotor 18. For example, as shown in the illustrated embodiment, the rotor 18 may include a main shaft 34 rotatable via a main bearing coupled to the hub 20 for rotation therewith. The main shaft 34 may, in turn, be rotatably coupled to a gearbox output shaft 36 of the generator 24 through a gearbox assembly 30, which will be discussed in more detail in reference to FIGS. 3-16. Further, the gearbox assembly 30 includes a gearbox housing 38 that is connected to a bedplate support frame 48 by one or more torque arms 50. As is generally understood, the main shaft 34 provides a low speed, high torque input to the gearbox assembly 30 in response to rotation of the rotor blades 22 and the hub 20. The gearbox assembly 30 then converts the low speed, high torque input to a high speed, low torque output to drive the gearbox output shaft 36 and, thus, the generator 24.

Each rotor blade 22 may also include a pitch adjustment mechanism 32 configured to rotate each rotor blade 22 about its pitch axis 28, depending on the wind speed and/or wind direction. As such, pitching the blades 22 directly affects the power output of the generator 24. More specifically, each pitch adjustment mechanism 32 may include a pitch drive motor 40 (e.g., any suitable electric, hydraulic, or pneumatic motor), a pitch drive gearbox 42, and a pitch drive pinion 44. In such embodiments, the pitch drive motor 40 may be coupled to the pitch drive gearbox 42 so that the pitch drive motor 40 imparts mechanical force to the pitch drive gearbox 42. Similarly, the pitch drive gearbox 42 may be coupled to the pitch drive pinion 44 for rotation therewith. The pitch drive pinion 44 may, in turn, be in rotational engagement with a pitch bearing 46 coupled between the hub 20 and a corresponding rotor blade 22 such that rotation of the pitch drive pinion 44 causes rotation of the pitch bearing 46. Thus, in such embodiments, rotation of the pitch drive motor 40 drives the pitch drive gearbox 42 and the pitch drive pinion 44, thereby rotating the pitch bearing 46 and the rotor blade 22 about the pitch axis 28. Similarly, the wind turbine 10 may include one or more yaw drive mechanisms 66 communicatively coupled to the controller 26, with each yaw drive mechanism(s) 66 being configured to change the angle of the nacelle 16 relative to the wind (e.g., by engaging a yaw bearing 68 of the wind turbine 10).

Figure 3:
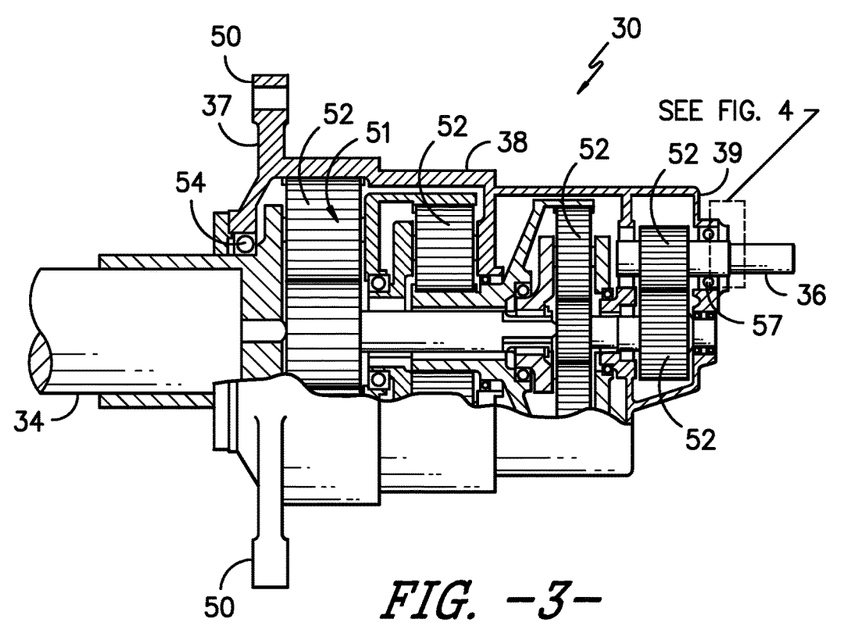
FIG. 3 illustrates a cross-sectional, top view of one embodiment of a gearbox assembly according to the present disclosure.

Referring now to FIG. 3, a cross-sectional, top view of one embodiment of the gearbox assembly 30 according to the present invention is illustrated. As shown, the gearbox assembly 30 includes a gearbox housing 38 having an upwind end 37 and a downwind end 39 that encloses a gear assembly 51. Further, as shown, the gearbox housing 38 includes an inlet opening for the main shaft 34 and an outlet opening for the gearbox output shaft 36. The gear assembly 51 may be any suitable gear assembly that uses one or more gears 52 and/or gear trains to provide speed and/or torque conversions from the main shaft 34 to the generator 24. For example, in certain embodiments, the gear assembly 51 may include a gear system having one or more outer or planet gears revolving about a central or sun gear. In addition, the planet gears may be mounted on a movable arm or carrier which itself may rotate relative to the sun gear. Moreover, the gear assembly 51 may also include at least one ring gear configured to mesh the planet gears. As the main shaft 34 rotates, the gears 52 of the gear assembly 51 convert the low speed, high torque input of the main shaft 34 to a high speed, low torque output to drive the gearbox output shaft 36 and, thus, the generator 24.

Figure 4:
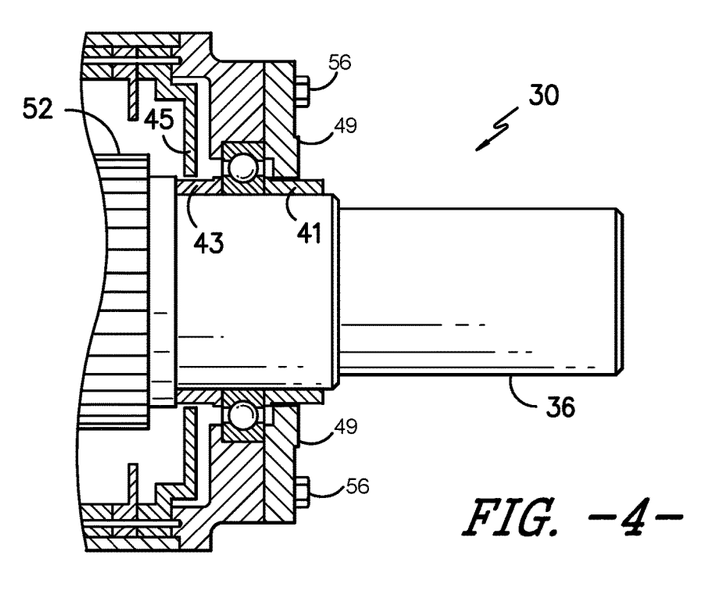
FIG. 4 illustrates a detailed, cross-sectional view of a portion of the gearbox assembly of FIG. 3.

Referring now to FIG. 4, the rotating shaft 36 may include internal and external oil slingers 41, 43 that rotate between a non-rotating oil shield ring 45 and internal and external cover plates 47, 49 of the gearbox housing 38 via a gearbox bearing 54. In addition, an anti-rotation pin 55 and/or a lock nut 56 may be configured with the rotating shaft 36 for securing the shaft 36 within the gearbox housing 38.

Referring now to FIGS. 5-16, the gearbox assembly 30 also includes at least one sleeve assembly 70 configured with the gearbox housing 38. More specifically, as shown the sleeve assembly 70 is at least partially embedded within the gearbox housing 38. Further, the sleeve assembly 70 is removable so as to provide additional space within the gearbox assembly 30 during disassembly or assembly thereof, which is discussed in more detail below. For example, in certain embodiments, the sleeve assembly 70 may be part of a gearbox disassembly kit. In such embodiments, the kit may also include a tooling device 82 configured to support one of the gearbox bearings of the gearbox during repair thereof, a support component 84 configured to support the gearbox shaft 36 during repair, and/or a lifting component 86 configured to move the gearbox shaft 36 during repair. In one embodiment, the support component 84 may include straps, slings, or similar. In another embodiment, the lifting component 86 may include a crane. Such components are further explained with reference to FIGS. 12-16. In alternative embodiments, the tooling device 82 may be omitted and a technician can support the shaft 36 and/or downwind bearing 57 instead.

Figure 5:
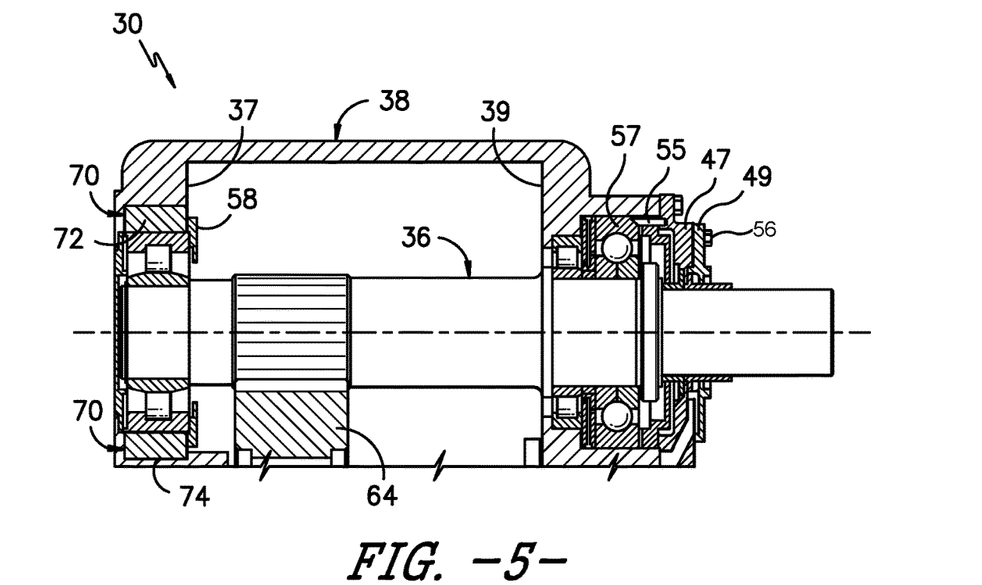
FIG. 5 illustrates a partial cross-sectional top view of one embodiment of a gearbox assembly according to the present disclosure, particularly illustrating a sleeve assembly at an upwind end of the gearbox housing.
Figure 6:
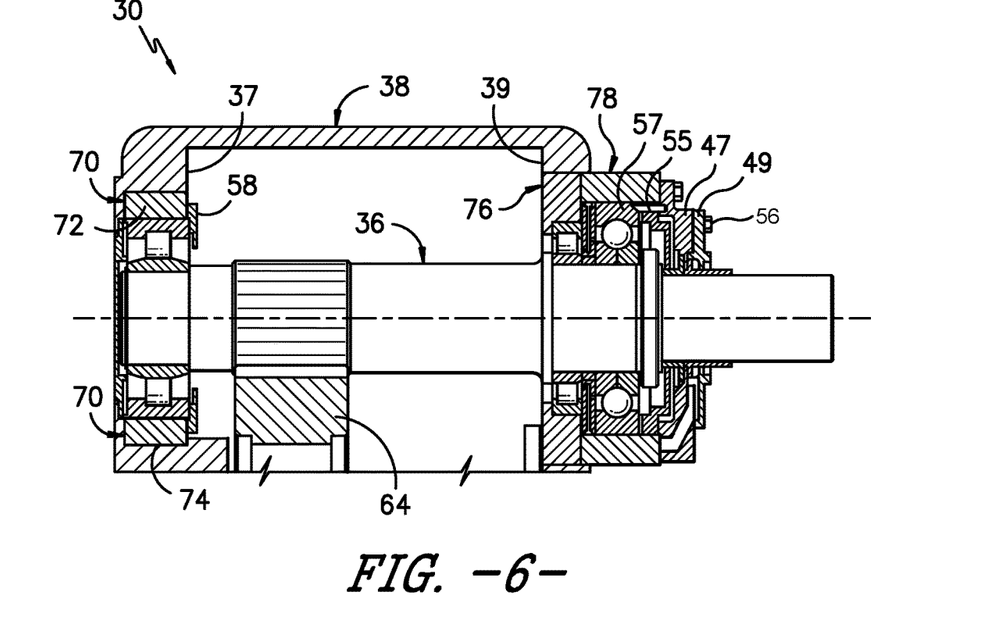
FIG. 6 illustrates a partial cross-sectional top view of one embodiment of a gearbox assembly according to the present disclosure, particularly illustrating a plurality of sleeve assemblies embedded at both the upwind and downwind ends of the gearbox housing.
Figure 7:
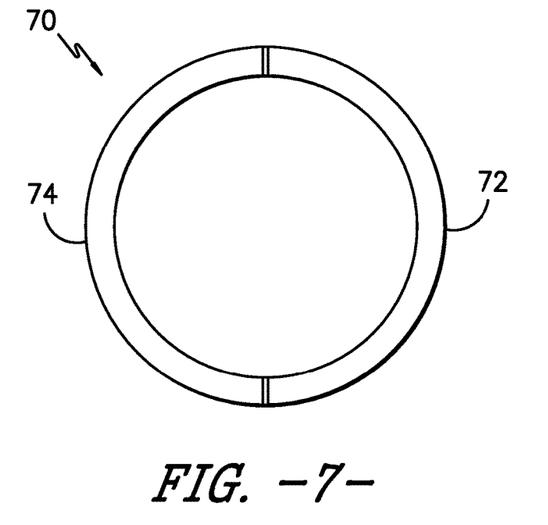
FIG. 7 illustrates a cross-sectional view of one embodiment of a sleeve assembly according to the present disclosure.

Further, as shown in FIGS. 5, 6, 8, 9, and 11-14, the sleeve assembly 70 may be completely embedded within the gearbox housing 38. More specifically, as shown, the sleeve assembly 70 may be embedded at the upwind end 37 of the gearbox housing 38. In further embodiments, as shown in FIG. 6, the gearbox assembly 38 may include at least one additional sleeve assembly 76, 78 mounted at the downwind end 39 of the gearbox housing 38. Thus, in certain embodiments, the gearbox assembly 30 may include a plurality of sleeve assemblies 76, 78 mounted at either or both of the upwind or downwind ends 37, 39 of the gearbox housing 38. In additional embodiments, as shown in FIGS. 5-7, each of the sleeve assemblies 70 may have a split configuration, e.g. having a first sleeve 72 and a second sleeve 74. In such embodiments, as shown in FIG. 7, the first sleeve 72 and the second sleeve 74 may be arranged in a ring-shape configuration. By having a ring-shape, the sleeves 72, 74, as well as their corresponding bore holes in the gearbox housing 38, can be easily machined. It should be understood that any other shape may also be suitable for the sleeve assembly 70.

The sleeve assembly 70 as described herein can be constructed of any suitable material, including but not limited to steel, cast iron, or any other suitable metal or non-metal materials having suitable machining properties, hardness and/or wear resistance.

Figure 10:
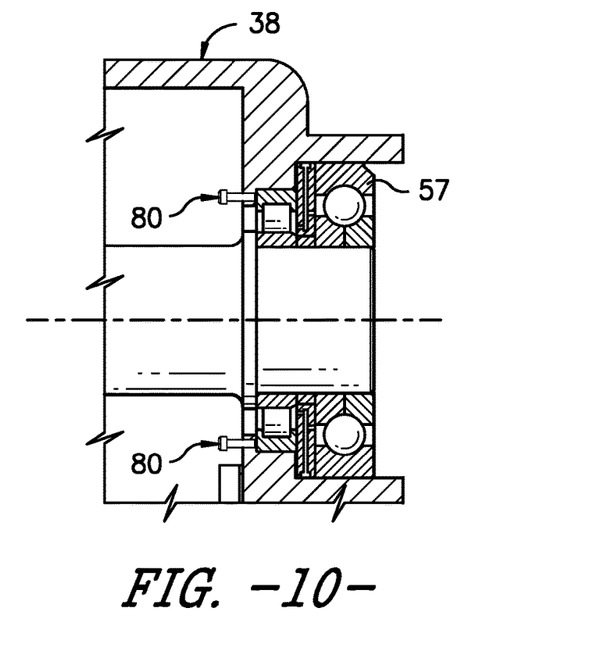
FIG. 10 illustrates a partial cross-sectional top view of one embodiment of a gearbox assembly according to the present disclosure, particularly illustrating a plurality of fasteners secured to the gearbox housing.

In another embodiment, as shown in FIGS. 6 and 10, the sleeve assembly 76,78 may also include at least one mounting component 80 configured to secure the sleeve assembly 76,78 within the gearbox housing 38. For example, in certain embodiments, the mounting component(s) 80 may include a flange, a fastener, an adhesive, or similar. More specifically, as shown in FIG. 10, the mounting components 80 correspond to fasteners.

Figure 8:
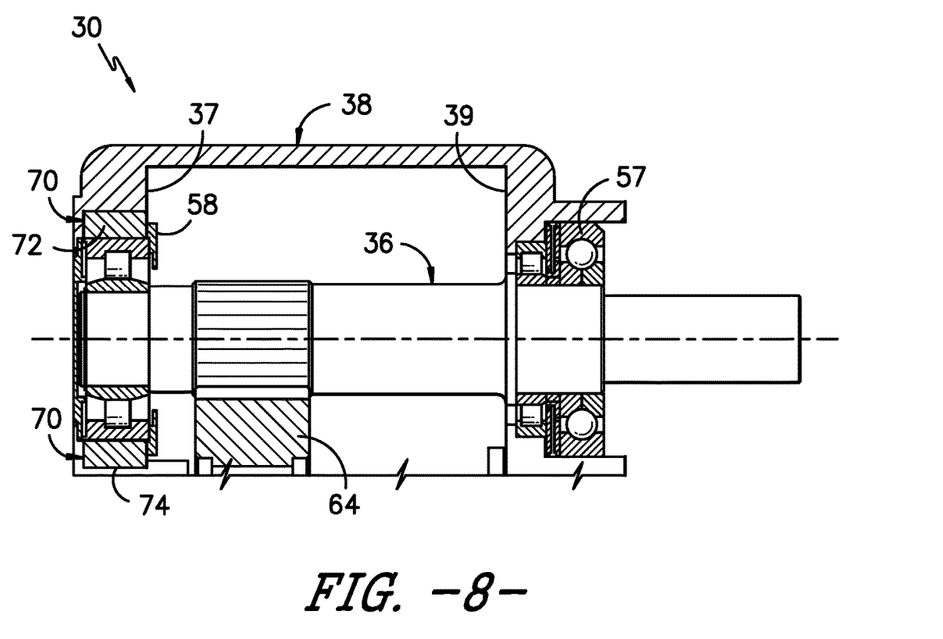
FIG. 8 illustrates a partial cross-sectional top view of one embodiment of a gearbox assembly according to the present disclosure, particularly illustrating downwind securement components removed from the gearbox assembly.

Referring particularly to FIGS. 5-16, the present disclosure is directed to a method for disassembling a gearbox of a wind turbine so as to easily repair and/or replace various components of the gearbox uptower. More specifically, as shown in FIGS. 5 and 8, the method includes removing one or more downwind securement components of the gearbox shaft 36. For example, as shown, the downwind securement components of the gearbox shaft 36 may include cover plates 47, 49 and oil slingers 41, 43, the anti-rotation pin 55, the oil shield ring 45, the lock nut 56, or similar. For example, as shown in FIG. 8, the cover plates 47, 49, the oil slingers 41, 43, the anti-rotation pin 55, the oil shield ring 45, and the lock nut 56 have been removed. As such, it should be understood that the downwind securement components described herein generally refer to any gearbox components that secure one or more gearbox components in place and need to be removed in order to complete a repair and/or replacement of a gearbox part.

Figure 9:
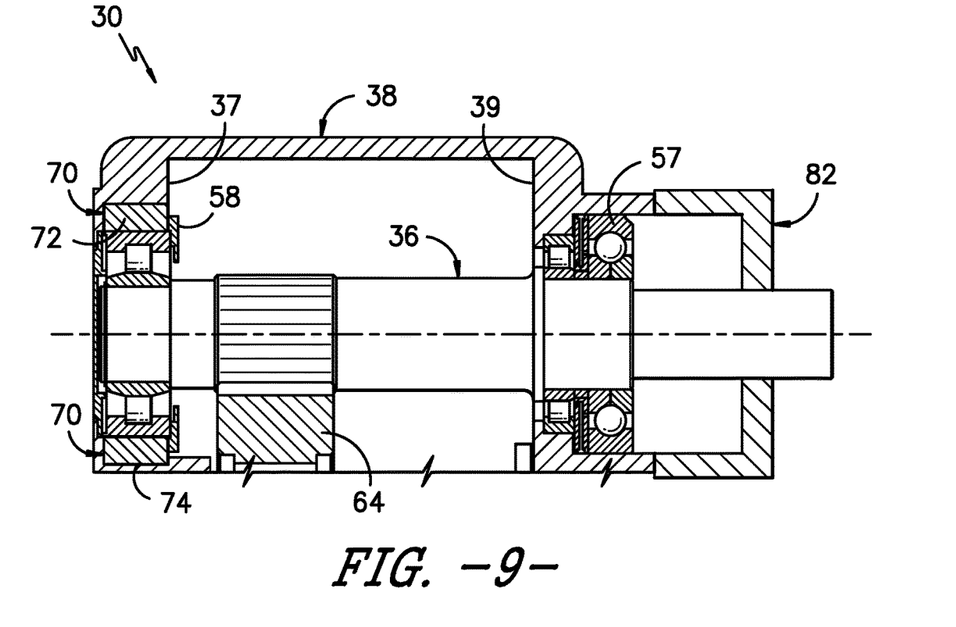
FIG. 9 illustrates a partial cross-sectional top view of one embodiment of a gearbox assembly according to the present disclosure, particularly illustrating a tooling device mounted to and supporting the gearbox shaft.
Figure 11:
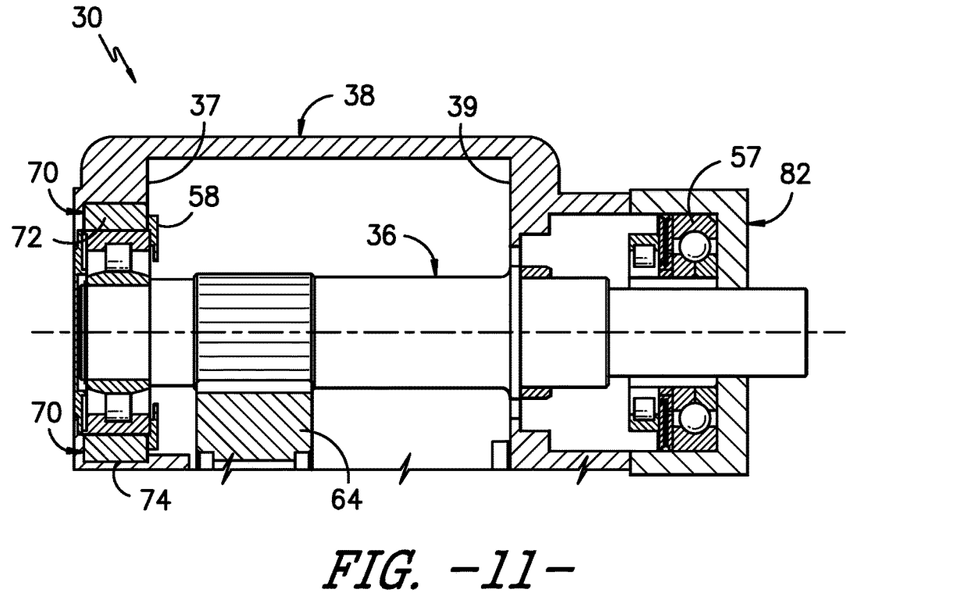
FIG. 11 illustrates a partial cross-sectional top view of one embodiment of a gearbox assembly according to the present disclosure, particularly illustrating the downwind gearbox bearing installed within the tooling device.

Referring now to FIG. 9, the method may include mounting a tooling device 82 at the downwind end 39 of the gearbox housing 38. As such, the tooling device 82 is configured to support at least a portion of the weight of the gearbox shaft 36 after the downwind gearbox bearings 57 are removed. More specifically, as shown in FIGS. 10 and 11, the method further includes securing the gearbox shaft 36 and the downwind gearbox bearing 57 into the tooling device 82. Alternatively, as mentioned, a technician may support the gearbox shaft 36 and/or the downwind gearbox bearing 57 rather than using the tooling device 82.

Figure 12:
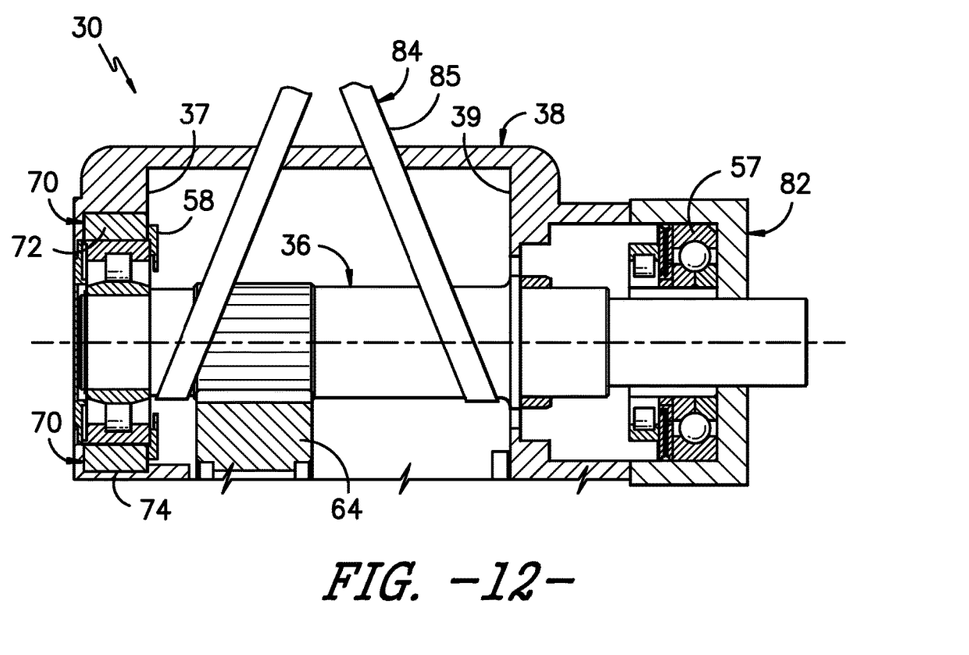
FIG. 12 illustrates a partial cross-sectional top view of one embodiment of a gearbox assembly according to the present disclosure, particularly illustrating the gearbox shaft being supported by a support component.
Figure 13:
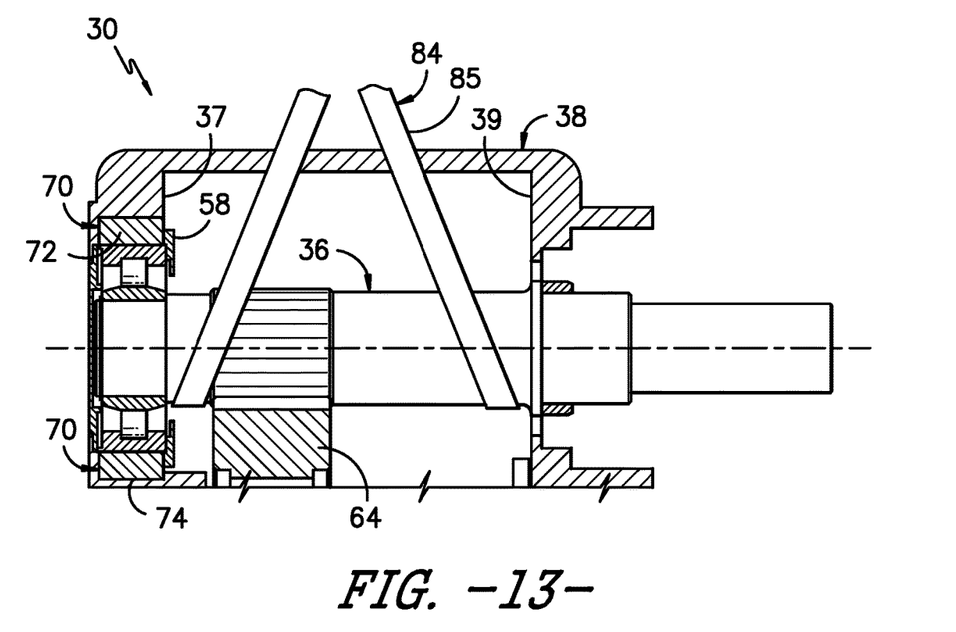
FIG. 13 illustrates a partial cross-sectional top view of one embodiment of a gearbox assembly according to the present disclosure, particularly illustrating the tooling device and the installed downwind gearbox bearing being removed.

Referring now to FIG. 12, the method includes supporting the gearbox shaft 36 via at least one support component 84. For example, as shown, one or more slings 85 may be secured around the gearbox shaft 36 to support at least a portion of the weight of the shaft 36. Referring now to FIG. 13, once the gearbox shaft 36 is properly supported via the support component(s) 84, the method may further include removing the tooling device 82 and the installed downwind gearbox bearing 57 from the gearbox shaft 36.

Figure 14:
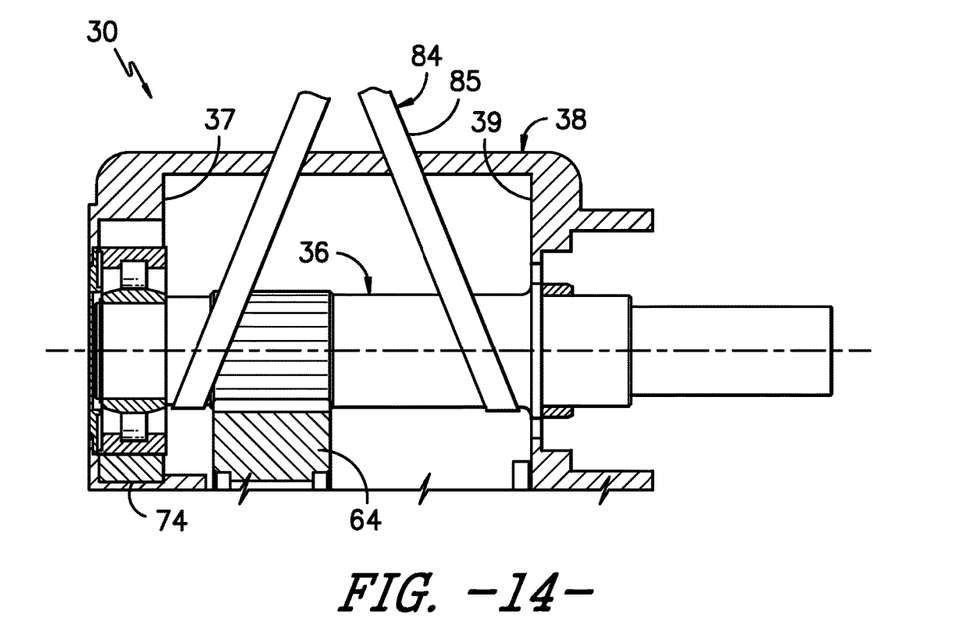
FIG. 14 illustrates a partial cross-sectional top view of one embodiment of a gearbox assembly according to the present disclosure, particularly illustrating a first sleeve of the sleeve assembly being removed.

Referring now to FIG. 14, the method may then include removing at least a portion of one of the sleeve assemblies 70. More specifically, as shown, the method may first include removing a pressing plate 58 from the upwind gearbox bearing 54 and then removing the first sleeve 72 that is embedded within the upwind end 37 of the gearbox housing 38. In yet another embodiment, the method may include removing at least one additional sleeve that is embedded within the upwind end 37 or the downwind end 39 of the gearbox housing 38. As mentioned, removing one or more of the sleeve assemblies 70 provides additional space within the gearbox housing 38 so as to make repair and/or replacement of the gearbox components feasible uptower.

Figure 15:
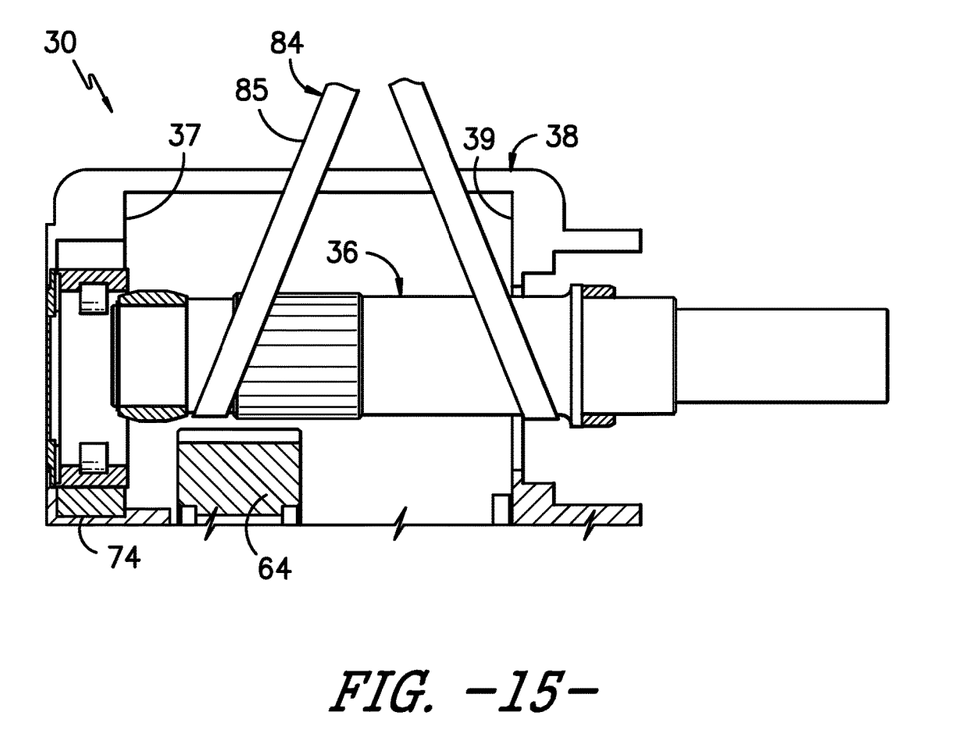
FIG. 15 illustrates a partial cross-sectional top view of one embodiment of a gearbox assembly according to the present disclosure, particularly illustrating the gearbox shaft being moved towards the generator.
Figure 16:
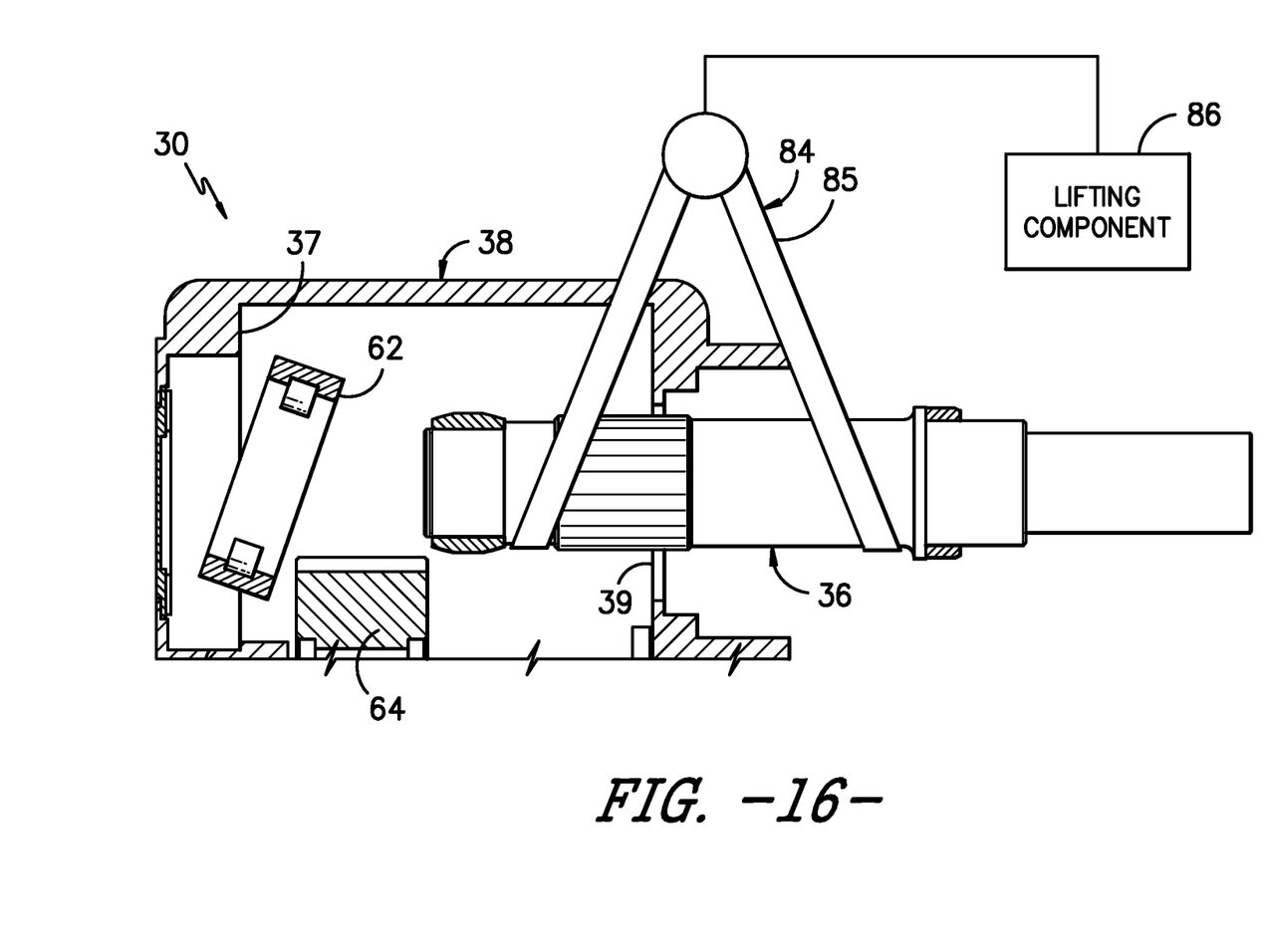
FIG. 16 illustrates a partial cross-sectional top view of one embodiment of a gearbox assembly according to the present disclosure, particularly illustrating an outer race of the upwind gearbox bearing being removed.

In addition, as shown in FIG. 15, once the pressing plate 58 is removed, the method may include moving the gearbox shaft 36 towards the generator 24 with the inner race of the upwind gearbox bearing 54 installed thereon and the outer race 62 of the upwind gearbox bearing 54 remaining in place. More specifically, in certain embodiments, the method may include moving the gearbox shaft 36 and the inner race of the upwind gearbox bearing 54 away from a gearbox shaft pinion and/or one or more bull gears 64 before moving the gearbox shaft 36 towards the generator 24. In such embodiments, a crane may be utilized to lift and move the gearbox shaft 36 up and towards the generator 24. Further, as shown in FIG. 16, the method may include removing the outer race 62 and rollers of the upwind gearbox bearing 54 from the gearbox housing 38. As such, the disassembly method described herein allows for easier repair and/or replacement of the gearbox components. It should be understood that the gearbox assembly 30 can be reassembled using the same steps as disassembly but in the opposite order.

In alternative embodiments, the method may include moving the gearbox shaft 36 simultaneously with the entire bearing (the inner race, rollers, and the outer race 62) away from a gearbox shaft pinion and/or one or more bull gears 64 before moving the gearbox shaft 36 towards the generator 24. In still another embodiment, the method may include moving the shaft 36 without any bearing part attached thereto, with the entire bearing being removed in another step.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for uptower repair and/or replacement of a gearbox of a wind turbine, the gearbox operably coupled to a generator via a gearbox shaft and housed within a nacelle mounted atop a tower of the wind turbine, the method comprising:
    removing one or more downwind securement components of a gearbox shaft of the gearbox;
    removing a downwind gearbox bearing of the gearbox, supporting the gearbox shaft via at least one support component;
    removing at least one sleeve assembly that is embedded within a gearbox housing so as to create additional space for repair and/or replacement of one or more gearbox components;
    moving the gearbox shaft towards the generator with an inner race of an upwind gearbox bearing installed thereon and an outer race of the upwind gearbox bearing remaining in place; and
    removing the outer race of the upwind gearbox bearing from the gearbox housing after the gearbox shaft is moved.

2. The method of claim 1, wherein removing the downwind gearbox bearing of the gearbox further comprises:
    mounting a tooling device at the downwind end of the gearbox housing of the gearbox; and,
    securing the gearbox shaft and the downwind gearbox bearing into the tooling device.

3. The method of claim 1, wherein the one or more downwind securement components of the gearbox shaft of the gearbox comprise at least one of a cover plate, an oil slinger, an anti-rotation pin, an oil shield ring, or a lock nut.

4. The method of claim 1, wherein the at least one support component comprises at least one of straps or slings.

5. The method of claim 1, further comprising removing a pressing plate from the upwind gearbox bearing before removing the first sleeve that is embedded within the upwind end of the gearbox housing.

6. The method of claim 1, wherein the inner race and the outer race of the upwind gearbox bearing remain in place as the shaft is moved.

7. The method of claim 1, further comprising moving the gearbox shaft away from at least one of a gearbox shaft pinion or one or more bull gears before moving the gearbox shaft towards the generator.

8. The method of claim 1, wherein removing at least one sleeve assembly that is configured with the gearbox housing further comprises removing a first sleeve at an upwind end of the gearbox housing.

9. The method of claim 1, wherein the inner race and the outer race of the upwind gearbox bearing are installed on the gearbox shaft as the shaft is moved.

10. The method of claim 9, wherein removing at least one sleeve assembly that is configured with the gearbox housing further comprises removing at least one additional sleeve that is embedded within at least one of the upwind end or a downwind end of the gearbox housing.

11. A method for repairing and/or replacing one or more gearbox components of a wind turbine gearbox uptower, the method comprising:
    removing one or more downwind securement components of a gearbox shaft of the gearbox;
    removing a downwind gearbox bearing of the gearbox;
    supporting the gearbox shaft via at least one support component;
    removing at least one sleeve assembly that is embedded within an upwind end of a gearbox housing;
    moving the gearbox shaft towards the generator with an inner race of an upwind gearbox bearing installed thereon and an outer race of the upwind gearbox bearing remaining in place;
    removing the outer race of the upwind gearbox bearing from the gearbox housing; and,
    repairing at least one of the downwind gearbox bearing, the upwind gearbox bearing, or the gearbox shaft.

12. The method of claim 11, wherein the sleeve assembly is at least partially embedded within the gearbox housing.

13. The method of claim 11, further comprising removing at least one additional sleeve assembly located at the downwind end of the gearbox housing.

* * * * *